United States Patent
Nomoto (10) Patent No.: US 7,635,964 B2
(45) Date of Patent: Dec. 22, 2009

(54) ELECTRONIC EQUIPMENT AND POWER MANAGEMENT METHOD FOR THE ELECTRONIC EQUIPMENT, AND POWER SOURCE UNIT

(75) Inventor: Kazutoshi Nomoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 508 days.

(21) Appl. No.: 10/563,510

(22) PCT Filed: Jun. 30, 2004

(86) PCT No.: PCT/JP2004/009607

§ 371 (c)(1),
(2), (4) Date: Jan. 4, 2006

(87) PCT Pub. No.: WO2005/003941

PCT Pub. Date: Jan. 13, 2005

(65) Prior Publication Data

US 2006/0192523 A1   Aug. 31, 2006

(30) Foreign Application Priority Data

Jul. 7, 2003   (JP) .............................. 2003-271572

(51) Int. Cl.
*H01M 10/44* (2006.01)
*H01M 8/00* (2006.01)
*H01M 8/04* (2006.01)
(52) U.S. Cl. ........................... 320/101; 429/12; 429/13; 429/22
(58) Field of Classification Search ................. 320/101, 320/103, 110, 111, 116, 117, 118, 119, 127, 320/128, 134, 135, 136, 140; 429/12, 13, 429/17, 19, 21, 9, 22, 23, 30; 307/10.7, 45, 307/46, 52, 66, 86, 9.1, 10.1
See application file for complete search history.

(56) References Cited

U.S. PATENT DOCUMENTS 5,475,271 A * 12/1995 Shibasaki et al. ............. 307/31

(Continued)

FOREIGN PATENT DOCUMENTS

JP          09-237132         9/1997

(Continued)

OTHER PUBLICATIONS

Japanese Office Action (for JP 2003-271572) issued on Mar. 17, 2009.

*Primary Examiner*—Edward Tso
*Assistant Examiner*—M'Baye Diao
(74) *Attorney, Agent, or Firm*—K&L Gates LLP (57) ABSTRACT

Electronic equipment and power management method for the power equipment and a power source unit are provided. The present invention provides a guideline associated with control content required to use a fuel cell as a power source in various kinds of electronic equipment, and perform appropriate power management according to loads. A notebook personal computer includes a hybrid pack which has a battery serving as a secondary battery, a battery protection IC for controlling this battery, a fuel cell for causing a predetermine fuel and air to electrochemically react with each other so as to cause a power generating unit to generate power, and a fuel cell controller for controlling this fuel cell, and a computer body at least having a CPU for executing various processes and consuming power. In the hybrid pack, the battery protection IC and the fuel cell controller mutually transfer at least remaining battery power information indicative of the amount of power remaining in the battery and fuel cell status information indicative of a status of the fuel cell, to each other via a bus.

26 Claims, 2 Drawing Sheets

U.S. PATENT DOCUMENTS

| | | | |
|---|---|---|---|
| 5,950,752 A * | 9/1999 | Lyons | 180/65.22 |
| 6,069,465 A * | 5/2000 | de Boois et al. | 318/675 |
| 6,104,162 A * | 8/2000 | Sainsbury et al. | 320/111 |
| 6,104,163 A | 8/2000 | Komatsu et al. | |
| 6,555,928 B1 * | 4/2003 | Mizuno et al. | 290/40 C |
| 6,555,989 B1 * | 4/2003 | Pearson | 320/101 |
| 6,793,027 B1 * | 9/2004 | Yamada et al. | 180/65.1 |
| 6,794,844 B2 * | 9/2004 | Hochgraf et al. | 320/101 |
| 2001/0018138 A1 * | 8/2001 | Iwase | 429/13 |
| 2004/0062962 A1 * | 4/2004 | Ozeki | 429/22 |
| 2004/0126632 A1 * | 7/2004 | Pearson et al. | 429/17 |
| 2004/0174072 A1 * | 9/2004 | Bourilkov et al. | 307/66 |
| 2004/0175602 A1 * | 9/2004 | Tahara | 429/23 |

FOREIGN PATENT DOCUMENTS

| | | |
|---|---|---|
| JP | 2000-078767 | 3/2000 |
| JP | 2001-069614 | 3/2001 |
| JP | 2001-189690 | 7/2001 |
| JP | 2001-189690 | 10/2001 |
| JP | 2001-306191 | 11/2001 |
| JP | 2001-337736 | 12/2001 |
| JP | 2002-091638 | 3/2002 |
| JP | 2002-169629 | 6/2002 |
| JP | 2003-032906 | 1/2003 |
| JP | 2003-115313 | 4/2003 |

* cited by examiner

| FUEL CELL | BATTERY | OUTPUT POWER | OPERATION |
|---|---|---|---|
| Lo | Lo | Lo | SET FUEL CELL TO Hi AND CHARGE BATTERY |
| Lo | Lo | Hi | SET FUEL CELL TO Hi, BUT IF SUFFICIENT POWER CANNOT BE SUPPLIED, SHUT DOWN |
| Lo | Hi | Lo | STAND BY |
| Lo | Hi | Hi | SET FUEL CELL TO Hi. DISCHARGE BATTERY UNTIL COMPLETION |
| Hi | Lo | Lo | CHARGE BATTERY |
| Hi | Lo | Hi | DISCHARGE FUEL CELL, AND IF EXTRA POWER CAN BE SUPPLIED, CHARGE BATTERY |
| Hi | Hi | Lo | SET FUEL CELL TO Lo. RETURN TO STANDBY |
| Hi | Hi | Hi | DISCHARGE FUEL CELL AND BATTERY |

ELECTRONIC EQUIPMENT AND POWER MANAGEMENT METHOD FOR THE ELECTRONIC EQUIPMENT, AND POWER SOURCE UNIT

CROSS REFERENCE TO RELATED APPLICATIONS

The present application claims priority to Japanese Patent Document No. P2003-271572 filed on Jul. 7, 2003, the disclosure of which is herein incorporated by reference.

The present invention relates to electronic equipment which operates on the basis of a predetermined power source, and a power management method for the electronic equipment, as well as a power source unit which supplies power to electronic equipment body connected to the same via a predetermined bus.

Electronic equipment of the type which use so-called secondary batteries such as lithium ion batteries as power sources, for example, information processing apparatuses such as notebook personal computers, mobile phones or personal digital assistants (PDAs), have recently become popular.

There is a so-called smart battery system (SBS) as a standard for power management in such electronic equipment using a secondary battery as a power source. This smart battery system is a standard for general power management to be mainly used in notebook personal computers or the like. For example, a notebook personal computer is physically roughly divided into a computer body and a battery section, and the smart battery system is applied so that the battery section is constructed to have intelligence.

Figure 4:
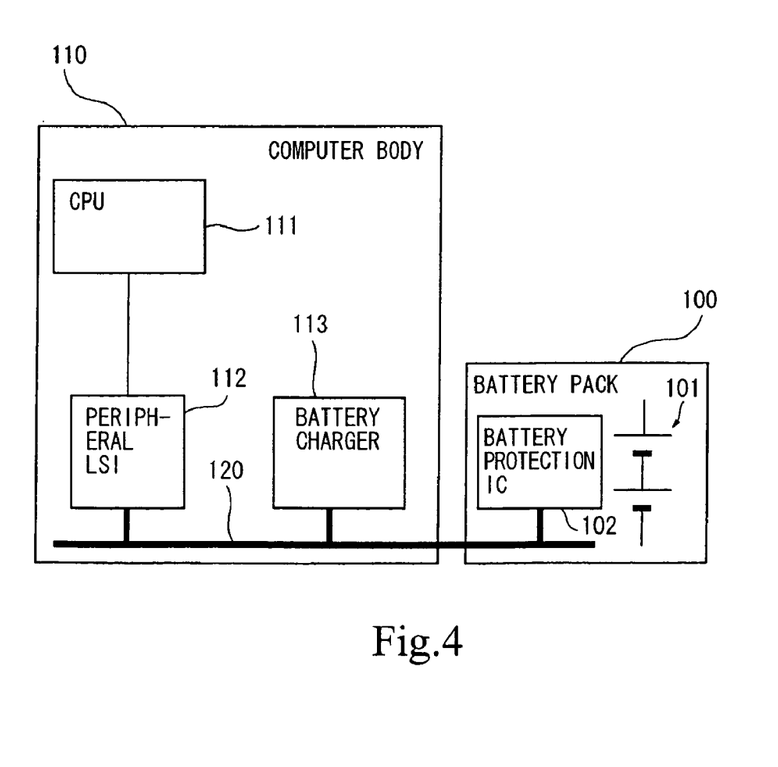
FIG. 4 is a block diagram showing a construction of a conventional notebook personal computer.

Specifically, as shown in FIG. 4, a notebook personal computer is constructed to be roughly divided into a battery pack 100 and a computer body 110.

The battery pack 100 is provided with a battery protection IC (Integrated Circuit) 102 as intelligence in addition to a battery 101, and realizes remaining battery power management, charge and discharge current detection as well as the function of protection from overdischarge, overcurrent, overheat and the like, by means of the battery protection IC 102.

The computer body 110 is provided with a CPU (Central Processing Unit) 111 and a peripheral LSI (Large Scale Integration) 112 which realizes various functions, as well as a battery charger 113 serving as a charger, and performs optimum charge and discharge control on the basis of voltage information and current information supplied from the battery 101. In addition, if a smart battery system is applied, the battery charger 113 is also called a smart charger.

In this notebook personal computer, the battery protection IC 102 in the battery pack 100 is connected to a predetermined bus which is called an SM bus (System Management Bus) 120, while the battery charger 113 in the computer body 110 is connected to the SM bus 120 and the CPU 111 is also connected to the SM bus 120 via the peripheral LSI 112, and so-called two-wire half-duplex communication is performed between the battery protection IC 102 and the CPU 111 as well as the battery charger 113.

On the other hand, various power-saving mechanisms have been proposed in order to reduce power consumption and promote efficient use of batteries in various information processing apparatuses such as notebook personal computers, and one example is a method called APM (Advanced Power Management). This APM is intended to reduce power consumption through means adapted to turn off an LCD (Liquid Crystal Display) serving as a display device and change the LCD to an idle mode, if a key input is not performed within a predetermined time.

In embedded applications to be used in mobile electronic equipment and the like, a further approach has been adopted: for example, according to "PowerWise" which is a technique developed by National Semiconductor Corporation and is described in Patent Document 1 (National Semiconductor Corporation, "POWERWISE", [online], [searched Jul. 3, 2003], Internet<URL:http://www.national.com/appinfo/power/powerwise.html>, a decision is made as to the load of a CPU by an OS (Operating System) on the basis of the amount of task work and scheduling such as task cueing, and a clock speed and/or a voltage to execute the work is set to realize supply of necessary and sufficient energy so as to promote a reduction of power consumption.

Furthermore, a similar technique is described in Patent Document 1 (Japanese Patent Application Publication No. 2002-91638), and the technique proposes a method in which an OS determines the status of a task and stops the clocks of peripheral devices or circuits to reduce power consumption.

Specifically, Patent Document 1 discloses a power consumption reduction system and a power consumption reduction method, both of which cause an arithmetic processing unit to operate during only the period in which there exists a task to be executed by the arithmetic processing unit and during only the period of an interrupt to the arithmetic processing unit in an information processing apparatus which time-shares a plurality of tasks, sequentially allocates the tasks to the arithmetic processing unit, and performs apparently parallel processing of the tasks. Patent Document 1 states that the method is capable of reducing power consumption without deteriorating a processing speed as viewed from a user while the user is actually using the information processing apparatus.

In addition, a fuel cell has recently been known which is supplied with a fuel gas containing a large amount of hydrogen or a fuel fluid and with oxygen (air) as an oxidizer gas and causes the fuel gas or the fuel fluid and the oxidizer gas to electrochemically react with each other so as to obtain generated power. For example, there is a fuel cell having a structure in which a proton conductor membrane serving as an electrolyte membrane is clamped between a fuel electrode and an air electrode.

Such a fuel cell is highly expected to be applied to electric vehicles or hybrid vehicles by being incorporated into vehicles such as automobiles as power sources, and in addition, because of its structure easy to reduce in weight and size, there are attempts to apply the fuel cell to power sources for various information processing apparatuses such as notebook personal computers, mobile phones or personal digital assistants. In addition, power generated by fuel cells for domestic or personal uses is supplied to electric appliances such as home information appliances.

However, as to fuel cells, there does not at all exist a power management standard like the above-mentioned one for secondary batteries, and if such fuel cells are to be used as power sources for various electronic equipment serving as auxiliary machines, it is completely unclear what control is to be carried out.

SUMMARY

The present invention has been made in view of these situations, and an object of the present invention is to provide electronic equipment capable of giving a guideline associated with control content required to use a fuel cell as a power source in various kinds of electronic equipment and performing appropriate power management according to loads, and a power management method for the electronic equipment, as well as a power source unit to be connected to the body of the electronic equipment.

Electronic equipment according to the present invention which achieves the above-mentioned object is electronic equipment which operates on the basis of a predetermined power source and is characterized by having: a body at least having processing means for executing various processes and consuming power; and a power source connected to the body via a predetermined bus, including a secondary battery, secondary battery control means for controlling the secondary battery, a fuel cell which causes a predetermined fuel and air to electrochemically react with each other so as to cause a power generating unit to generate power, and fuel cell control means for controlling the fuel cell. The secondary battery control means and the fuel cell control means mutually transfer at least remaining secondary battery power information indicative of an amount of power remaining in the secondary battery and fuel cell status information indicative of a status of the fuel battery, to each other via the bus.

A power management method for electronic equipment according to the present invention which achieves the above-mentioned object is a power management method for electronic equipment which includes: a body at least having processing means for executing various processes and consuming power; and a power source connected to the body via a predetermined bus, including a secondary battery, secondary battery control means for controlling the secondary battery, a fuel cell which causes a predetermined fuel and air to electrochemically react with each other so as to cause a power generating unit to generate power, and fuel cell control means for controlling the fuel cell, wherein the electronic equipment operates on the basis of the power source. The power management method for the electronic equipment is characterized by including: a step of mutually transferring at least remaining secondary battery power information indicative of an amount of power remaining in the secondary battery and fuel cell status information indicative of a status of the fuel battery between the secondary battery control means and the fuel cell control means via the bus; and a step of controlling the fuel cell on the basis of the remaining secondary battery power information and the fuel cell status information.

A power source unit according to the present invention which achieves the above-mentioned object is a power source unit connected via a predetermined bus to a predetermined electronic equipment body at least having processing means for executing various processes and consuming power, for supplying power to the electronic equipment body. The power source unit is characterized by including: a secondary battery; secondary battery control means for controlling the secondary battery; a fuel cell which causes a predetermined fuel and air to electrochemically react with each other so as to cause a power generating unit to generate power; and fuel cell control means for controlling the fuel cell. The secondary battery control means and the fuel cell control means mutually transfer at least remaining secondary battery power information indicative of an amount of power remaining in the secondary battery and fuel cell status information indicative of a status of the fuel battery, to each other via the bus.

In each of the electronic equipment and the power management method for the electronic equipment as well as the power source unit according to the present invention, at least the remaining secondary battery power information and the fuel cell status information are mutually transferred between the secondary battery control means and the fuel cell control means via the bus so as to control the secondary battery and the fuel cell.

In addition, the above-mentioned electronic equipment according to the present invention is characterized in that the fuel cell control means acquires load information indicative of a load of the processing means via the bus and controls the fuel cell on the basis of the load information.

Furthermore, the above-mentioned power management method for the electronic equipment according to the present invention is characterized by including a step of acquiring load information indicative of a load of the processing means by means of the fuel cell control means via the bus, and the fuel cell is controlled on the basis of the load information in the step of controlling the fuel cell.

Furthermore, the above-mentioned power source unit according to the present invention is characterized in that the secondary battery control means and the fuel cell control means are connected to the electronic equipment body via the bus, and the fuel cell control means acquires load information indicative of a load of the processing means via the bus and controls the fuel cell on the basis of the load information.

Each of the electronic equipment and the power management method for the electronic equipment as well as the power source unit according to the present invention, controls the fuel cell through the fuel cell control means on the basis of the load information of the processing means.

Additional features and advantages of the present invention are described in, and will be apparent from, the following Detailed Description and the figures.

DETAILED DESCRIPTION

A specific embodiment to which the present invention is applied will be described below in detail with reference to the accompanying drawings.

This embodiment is electronic equipment such as notebook personal computers, mobile phones or personal digital assistants (PDAs), which operates on the basis of a predetermined power source. This electronic equipment uses a secondary battery such as a lithium ion battery and a fuel cell which generates power by using a predetermined fuel such as hydrogen serving as a fuel gas or methanol and air serving as an oxidizer gas, as a power source in a compositely combined manner, and performs appropriate power management which cooperatively controls the secondary battery and the fuel cell.

In addition, the following description is made on the assumption that the electronic equipment is a notebook personal computer and mainly uses as a power source a hybrid pack in which a secondary battery and a fuel cell are compositely combined with each other, instead of an existing battery pack made of a secondary battery such as a lithium ion battery.

Figure 1:
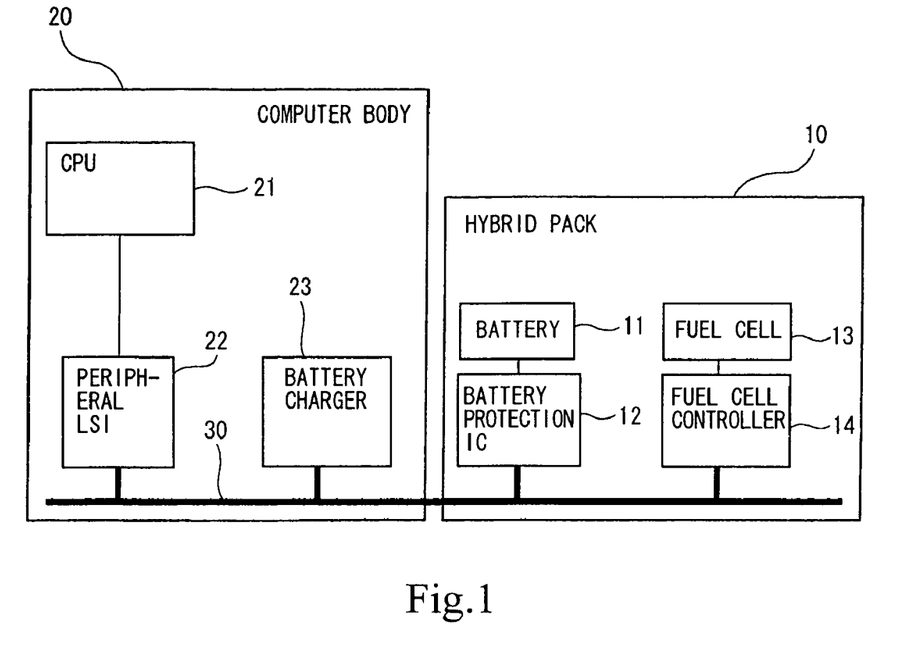
FIG. 1 is a block diagram showing a construction of a notebook personal computer which is one example of electronic equipment presented as an embodiment of the present invention.

As shown in FIG. 1, the notebook personal computer is roughly divided into a computer body 20 and a hybrid pack 10 which serves as a power source for supplying power to the computer body 20 which will be described later.

The hybrid pack 10 is provided with a battery 11 serving as a secondary battery, a battery protection IC (Integrated Circuit) 12 serving as secondary battery control means for controlling this battery 11, a fuel cell 13 which is supplied with a predetermined fuel such as hydrogen or methanol serving as a fuel gas and air serving as an oxidizer gas and causes the fuel and the air to electrochemically react with each other so as to cause a power generating unit to generate power, and a fuel cell controller 14 serving as fuel cell control means for controlling this fuel cell 13.

The battery 11 is made of a lithium ion battery, for example, and can use an existing secondary battery. The battery 11 is chargeable by a battery charger 23 which will be described later, under control of the battery protection IC 12. In addition, as will be described later, the battery 11 is also constructed to be chargeable by the fuel cell 13 under control of the fuel cell controller 14. Power discharged from this battery 11 is used as operating power for the computer body 20.

The battery protection IC 12 is incorporated as intelligence for controlling the battery 11, and not only performs management of the amount of power remaining in the battery 11 and detection of charge and discharge currents of the battery 11, but also protects the battery 11 from overdischarge, overcurrent, overheat and the like.

The fuel cell 13 has a structure in which, for example, a proton conductor membrane serving as an electrolyte membrane is clamped between a fuel electrode and an air electrode, and generates power by using fuel supplied from a predetermined fuel tank, under control of the fuel cell controller 14. Power generated by the fuel cell 13 is used as operating power for the computer body 20. The power generated by the fuel cell 13 is also used for charging the battery 11.

The fuel cell controller 14 is incorporated as intelligence responsible for control of the fuel cell 13, and performs monitoring of the status of the fuel cell 13 and measurement of current and voltage of the same.

On the other hand, the computer body 20 is provided with a CPU (Central Processing Unit) 21 serving as processing means for executing various processes and consuming power, a peripheral LSI (Large Scale Integration) 22 which realizes various functions, and a battery charger 23 serving as a charger for the battery 11, and is constructed similarly to existing ones.

In such notebook personal computer, the battery protection IC 12 and the fuel cell controller 14 in the hybrid pack 10 are connected to a predetermined bus 30 such as a so-called SM bus (System Management Bus). In addition, in the notebook personal computer, the battery charger 23 in the computer body 20 is connected to the bus 30, and the CPU 21 is also connected to the bus 30 via the peripheral LSI 22. In the notebook personal computer, so-called two-wire half-duplex communication is performed between the battery protection IC 12 as well as the fuel cell controller 14 and the CPU 21 as well as the battery charger 23.

At this time, in the notebook personal computer, various kinds of information at least including remaining battery power information indicative of the amount of power remaining in the battery 11 and fuel cell status information indicative of a status of the fuel cell 13 are mutually transferred between the battery protection IC 12 and the fuel cell controller 14 via the bus 30 so that the battery 11 and the fuel cell 13 are controlled on the basis of those kinds of information.

In the notebook personal computer, if the amount of power remaining in the battery 11 becomes small, for example, the following control is performed: discharging from the battery 11 is suppressed or stopped to perform charging of the battery 11 by the battery charger 23, under control of the battery protection IC 12, and the amount of fuel to be supplied to the fuel cell 13 is increased to compensate for a power increase corresponding to the amount of power charged into the battery 11, under control of the fuel cell controller 14.

In addition, in the notebook personal computer, if the battery 11 is close to a fully charged state, the following control can also be performed: the output from the battery 11 is increased under control of the battery protection IC 12, and the amount of fuel to be supplied to the fuel cell 13 is decreased under control of the fuel cell controller 14.

In this manner, in the notebook personal computer, the various kinds of information can be mutually transferred between the battery protection IC 12 and the fuel cell controller 14 via the bus 30 so that power management which cooperatively controls the battery 11 and the fuel cell 13 can be performed on the basis of those kinds of information.

In addition, in the notebook personal computer, since the hybrid pack 10 and the computer body 20 are constructed to be connected via the bus 30, it is possible to increase the degree of freedom of a physical construction of three constituent elements, i.e., the battery 11, the fuel cell 13 and the computer body 20.

For example, in the notebook personal computer, it is possible to adopt not only a construction in which, as shown in FIG. 1, the battery 11 and the battery protection IC 12 as well as the fuel cell 13 and the fuel cell controller 14 are constructed as a single package to be externally connected to the computer body 20 via the bus 30, but also a construction in which the battery 11 and the battery protection IC 12 are contained in the computer body 20 and connected to the bus 30, and a power pack having the fuel cell 13 and the fuel cell controller 14 constructed as a single package is externally connected to the computer body 20 via the bus 30. Otherwise, it is also possible to adopt a construction in which the fuel cell 13 and the fuel cell controller 14 are contained in the computer body 20 and connected to the bus 30, and a power pack having the battery 11 and the battery protection IC 12 constructed as a single package is externally connected to the computer body 20 via the bus 30. In addition, in the notebook personal computer, it is also possible to adopt a construction in which a power pack made of the battery 11 and the battery protection IC 12 and a power pack made of the fuel cell 13 and the fuel cell controller 14 are separately constructed, and these two power packs are externally connected to the computer body 20 via the bus 30. Furthermore, in the notebook personal computer, it is also possible to adopt a construction in which all of the battery 11, the battery protection IC 12, the fuel cell 13 and the fuel cell controller 14 are contained in the computer body 20 and connected to the bus 30.

Accordingly, whatever construction the notebook personal computer has, the notebook personal computer can be controlled in a common manner based on the same topology for electrical signals by adopting a bus construction.

Furthermore, in the notebook personal computer, as mentioned above, it is possible to perform charging of the battery 11 by not only the battery charger 23 but also the fuel cell 13 under control of the battery protection IC 12 and the fuel cell controller 14.

Figure 2:
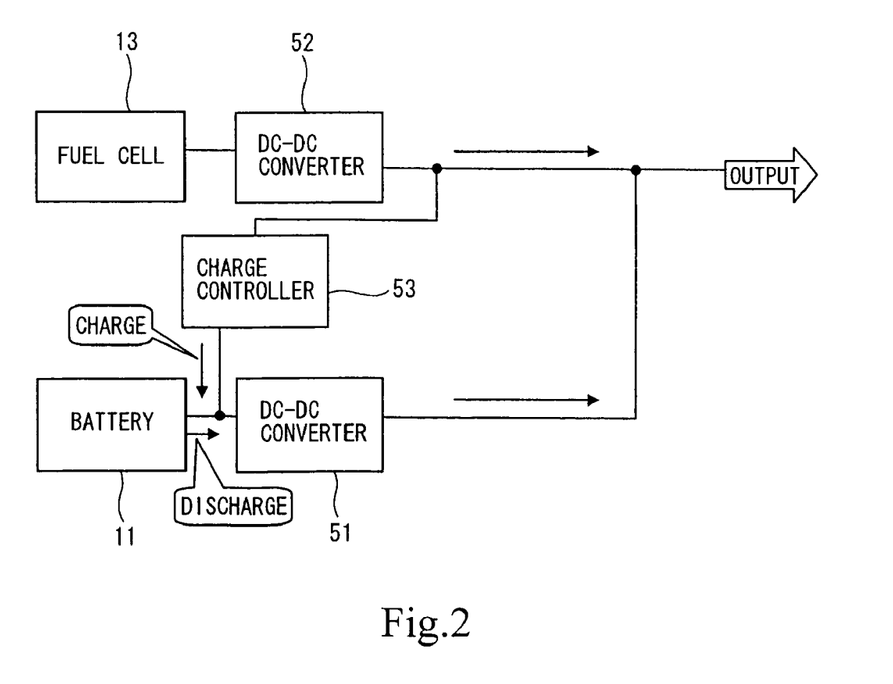
FIG. 2 is a block diagram showing a circuit construction of a hybrid pack used as a power source for the notebook personal computer which is one example of the electronic equipment presented as the embodiment of the present invention, and is a view for explaining the function of performing charging of a battery by a fuel cell.

More specifically, the hybrid pack 10 has a circuit construction in which, as shown in FIG. 2, power discharged from the battery 11 is transformed by a DC(Direct Current)-DC converter 51 controlled by the battery protection IC 12 and outputted to the computer body 20, while power generated by the fuel cell 13 is transformed by a DC-DC converter 52 controlled by the fuel cell controller 14 and outputted to the computer body 20, and in addition, the fuel cell controller 14 functions as a charge controller 53 and supplies the power transformed by the DC-DC converter 52 to the battery 11.

Accordingly, in the notebook personal computer, it is also possible to perform charging of the battery 11 by the fuel cell 13 under control of the battery protection IC 12 and the fuel cell controller 14, so that it is possible to effectively use power generated by the fuel cell 13.

A more specific example of the cooperative control of the battery 11 and the fuel cell 13 will be described below.

It is assumed here that a normal mode and a standby mode are prepared in the fuel cell controller 14 as two operating modes for the fuel cell 13.

When in the normal mode, the fuel cell 13 is mainly controlled in a constant voltage mode for steadily outputting power at a constant voltage, by the fuel cell controller 14, and generates power by being supplied with the necessary fuel and air. More specifically, when in the normal mode, the fuel cell 13 performs high power generation. At this time, the fuel cell controller 14 increases the temperature of the power generating unit formed as a stack structure in the fuel cell 13 to an appropriate temperature, thereby activating power generation reaction.

On the other hand, when the fuel cell 13 is in the standby mode, under control of the fuel cell controller 14, the amounts of fuel and air to be supplied to the fuel cell 13 are reduced and the fuel cell 13 performs power generation so that power to be consumed by the computer body 20 which is an auxiliary machine is decreased to increase the rate of power consumption. More specifically, the fuel cell 13 performs low power generation in the standby mode.

In the notebook personal computer, load information indicative to the load of the CPU 21 recognized by an OS (Operating System) executed by the CPU 21 in the computer body 20 is supplied to the fuel cell controller 14 via the bus 30 in order to perform power generation control of the fuel cell 13 in each of the normal mode and the standby mode.

The fuel cell controller 14 acquires the load information of the CPU 21 and grasps whether the CPU 21 is in an idle state or in a busy state which waits for a task to be processed, and selects whether the fuel cell 13 is to be operated in the normal mode or the standby mode, on the basis of the information.

Furthermore, the fuel cell controller 14 acquires remaining battery power information indicative of the amount of power remaining in the battery 11 from the battery protection IC 12 via the bus 30 and acquires fuel cell status information indicative of a status of the fuel cell 13 from the fuel cell 13, and determines an operating mode for the fuel cell 13 by taking also the remaining battery power information and the fuel cell status information into account.

In the notebook personal computer, if output power for the load of the CPU 21 sharply increases, for example, the fuel cell 13 transfers from the standby mode to the normal mode so as to start high power generation. However, when the temperature of the power generating unit is low, for example, immediately after the start of driving, since it takes time for the fuel cell 13 to become able to perform generation at rated output, the battery 11 which is in a charge complete state is caused to auxiliarily discharge, thereby compensating for power outputted from the fuel cell 13.

In addition, in the notebook personal computer, in the case where the load of the CPU 21 is small, if the battery 11 needs to be charged, power outputted from the fuel cell 13 is used for charging the battery 11.

Figure 3:
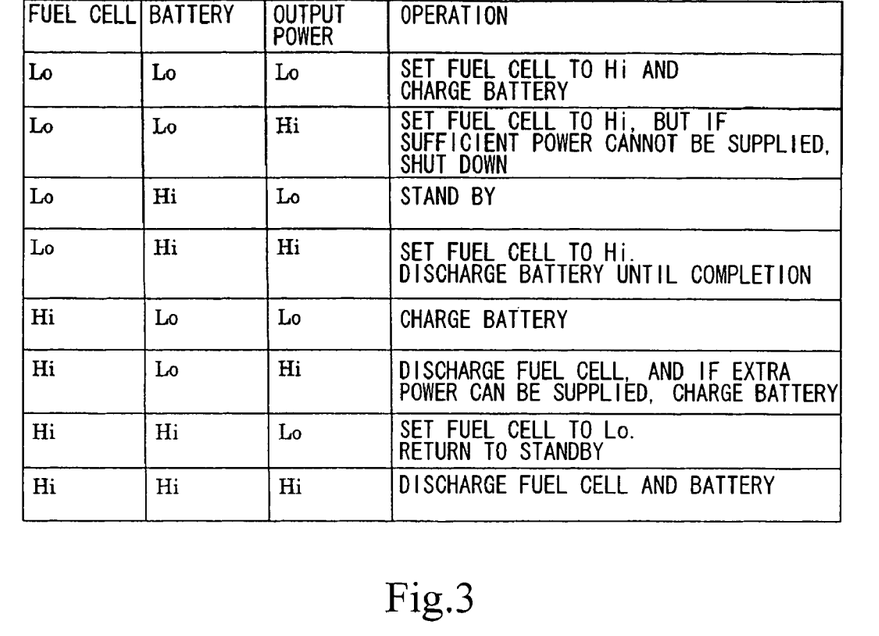
FIG. 3 is a view showing control contents of the battery and the fuel cell for operating modes of the battery and the fuel cell and output voltages for loads of a CPU.

Control contents of the battery 11 and the fuel cell 13 for the operating modes of the battery 11 and the fuel cell 13 and output voltages for the load of the CPU 21 will be summarized as shown in FIG. 3 by way of example. In FIG. 3, the case where the fuel cell 13 is in the standby mode is denoted by "Lo", the case where the fuel cell 13 is in the normal mode is denoted by "Hi", the case where the amount of power remaining in the battery 11 is small is denoted by "Lo", the case where the amount of power remaining in the battery 11 is large is denoted by "Hi", the case where the load of the CPU 21 is small and the output power from the hybrid pack 10 may be small is denoted by "Lo", and the case where the load of the CPU 21 is large and the output power from the hybrid pack 10 needs to be made large is denoted by "Hi".

More specifically, according to the control shown in FIG. 3, in the notebook personal computer, if the fuel cell 13 is in the standby mode and the amount of power remaining in the battery 11 is small and, in addition, the load of the CPU 21 is small, the battery 11 and the fuel cell 13 are controlled by the battery protection IC 12 and the fuel cell controller 14 so that the fuel cell 13 is made to transfer to the normal mode and power outputted from the fuel cell 13 is outputted to the computer body 20 and so that the power outputted from the fuel cell 13 is used to charge the battery 11.

In addition, in the notebook personal computer, if the fuel cell 13 is in the standby mode and the amount of power remaining in the battery 11 is small and, in addition, the load of the CPU 21 is large, the battery 11 and the fuel cell 13 are controlled by the battery protection IC 12 and the fuel cell controller 14 so that the fuel cell 13 is made to transfer to the normal mode and power outputted from the fuel cell 13 is outputted to the computer body 20, but if sufficient power cannot be supplied by this output, the computer body 20 is shut down.

Furthermore, in the notebook personal computer, if the fuel cell 13 is in the standby mode and the amount of power remaining in the battery 11 is large and, in addition, the load of the CPU 21 is small, the battery 11 and the fuel cell 13 are controlled by the battery protection IC 12 and the fuel cell controller 14 so that the fuel cell 13 is maintained in the normal mode and power outputted from the fuel cell 13 is outputted to the computer body 20.

Furthermore, in the notebook personal computer, if the fuel cell 13 is in the standby mode and the amount of power remaining in the battery 11 is large and, in addition, the load of the CPU 21 is large, the battery 11 and the fuel cell 13 are controlled by the battery protection IC 12 and the fuel cell controller 14 so that the fuel cell 13 is made to transfer to the standby mode and power outputted from the fuel cell 13 is outputted to the computer body 20 and so that power is discharged from the battery 11 and outputted to the computer body 20 until the fuel cell 13 becomes able to perform generation at rated output.

In addition, in the notebook personal computer, if the fuel cell 13 is in the normal mode and the amount of power remaining in the battery 11 is small and, in addition, the load of the CPU 21 is small, the battery 11 and the fuel cell 13 are controlled by the battery protection IC 12 and the fuel cell controller 14 so that the fuel cell 13 is maintained in the normal mode and power outputted from the fuel cell 13 is outputted to the computer body 20 and so that the power outputted from the fuel cell 13 is used to charge the battery 11.

Furthermore, in the notebook personal computer, if the fuel cell 13 is in the normal mode and the amount of power remaining in the battery 11 is small and, in addition, the load of the CPU 21 is large, the battery 11 and the fuel cell 13 are controlled by the battery protection IC 12 and the fuel cell controller 14 so that the fuel cell 13 is maintained in the normal mode and power outputted from the fuel cell 13 is outputted to the computer body 20, and if the fuel cell 13 can supply extra power, the power outputted from the fuel cell 13 is used to charge the battery 11.

Furthermore, in the notebook personal computer, if the fuel cell 13 is in the normal mode and the amount of power remaining in the battery 11 is large and, in addition, the load of the CPU 21 is small, the battery 11 and the fuel cell 13 are controlled by the battery protection IC 12 and the fuel cell controller 14 so that the fuel cell 13 is made to transfer to the standby mode and power outputted from the fuel cell 13 is outputted to the computer body 20.

In addition, in the notebook personal computer, if the fuel cell 13 is in the normal mode and the amount of power remaining in the battery 11 is large and, in addition, the load of the CPU 21 is large, the battery 11 and the fuel cell 13 are controlled by the battery protection IC 12 and the fuel cell controller 14 so that the fuel cell 13 is maintained in the normal mode and power outputted from the fuel cell 13 is outputted to the computer body 20 and so that power is discharged from the battery 11 and outputted to the computer body 20.

Accordingly, in the notebook personal computer, the operating mode of the fuel cell 13 is determined on the basis of load information of the CPU 21, remaining battery power information and fuel cell status information so that it is possible to perform appropriate power management which cooperatively controls the battery 11 and the fuel cell 13 according to loads. At this time, in the notebook personal computer, the fuel cell controller 14 can acquire power consumption information based on task scheduling, by acquiring the load information of the CPU 21 recognized by the OS. Accordingly, as compared with the conventional method of detecting the consumption current of a CPU, the hybrid pack 10 can make appropriate preparation for "estimates" of power consumption due to variations in the load of the CPU 21, so that it is possible to perform appropriate power control management which cooperatively controls the battery 11 and the fuel cell 13.

As described hereinabove in detail, in the electronic equipment presented as an embodiment of the present invention, the hybrid pack 10 in which the battery 11 and the fuel cell 13 are compositely combined with each other is used as a power source, and various kinds of information at least including remaining battery power information indicative of the amount of power remaining in the battery 11 and fuel cell status information indicative of a status of the fuel cell 13 are mutually transferred between the battery protection IC 12 and the fuel cell controller 14 via the bus 30 so that appropriate power management which cooperatively controls the battery 11 and the fuel cell 13 can be performed on the basis of those kinds of information.

In addition, in the electronic equipment, it is possible to perform appropriate power management which cooperatively controls the battery 11 and the fuel cell 13 according to loads, by acquiring the load information of the CPU 21 by means of the fuel cell controller 14.

In addition, the present invention is not limited to the above-mentioned embodiment. The above-mentioned embodiment has been described as setting the charge status of the battery 11, the status of the fuel cell 13 and the status of the CPU 21 in two steps each, as shown in FIG. 3 by way of example, and performing control according to combinations of the steps of these statuses. However, the present invention may also be adapted to perform three or more steps of setting or condition setting based on an analog function, and also makes it possible to arbitrarily set control content based on such setting.

In addition, according to the present invention, a predetermined controller serving as control means may be provided on a fuel tank which supplies fuel to the fuel cell 13, and this controller may be connected to the bus 30 so as to monitor the remaining amount of fuel stored in the fuel tank so that the fuel cell controller 14 controls the operation of the fuel cell 13 on the basis of the remaining amount of fuel detected by the controller. In addition, the fuel cell controller 14 itself may also be constructed to have the function of monitoring the remaining amount of fuel.

Furthermore, according to the present invention, in addition to methanol, a gas such as ethanol or hydrogen may be used as fuel.

Furthermore, although the above-mentioned embodiment has been described as mainly using a lithium ion battery as the battery 11, the present invention can use a so-called nickel hydrogen battery or the like, and may also use a capacitor.

In the above-mentioned embodiment, individual sections have been described as being mainly connected to one another via the SM bus, but the present invention can also be applied to general purpose buses.

Furthermore, the above-mentioned electronic equipment is not limited to notebook personal computers, and the present invention can be applied to, for example, portable printers or facsimile machines, peripheral devices for personal computers, telephones including mobile phones, television receivers, communication devices, personal digital assistants, cameras, audio equipment, video equipment, electric fans, refrigerators, irons, pots, cleaners, rice cookers, electromagnetic cookers, illumination equipment, toys such as game machines or radio-controlled model cars, power tools, medical equipment, measurement equipment, equipment incorporated in vehicles, office equipment, health and beauty equipment, electronically controlled robots, wearable electronic equipment, leisure equipment and sports equipment. The present invention can also be applied to any arbitrary electronic equipment that uses a fuel cell as a power source in other applications.

Accordingly, it goes without saying that the present invention can be appropriately modified without departing from the scope of the present invention.

INDUSTRIAL APPLICABILITY

In each of the electronic equipment and the power management method for the electronic equipment as well as the power source unit according to the present invention, at least the remaining secondary battery power information and the fuel cell status information are mutually transferred between the secondary battery control means and the fuel cell control means via the bus so that appropriate power management which cooperatively controls the secondary battery and the fuel cell can be performed on the basis of the secondary battery power information and the fuel cell status information.

In each of the electronic equipment and the power management method for the electronic equipment as well as the power source unit according to the present invention, since the body and the power source are constructed to be connected to each other via the bus, it is possible to increase the degree of freedom of a physical construction of the secondary battery, the fuel cell and the body.

In each of the electronic equipment and the power management method for the electronic equipment as well as the power source unit according to the present invention, the fuel cell is controlled by the fuel cell control means on the basis of load information of the processing means so that appropriate power management can be performed according to loads.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electronic equipment that operates based on a predetermined power source, the electronic equipment comprising:
   a body at least having processing means for executing various processes and consuming power; and
   a power source connected to the body via a predetermined bus, including a secondary battery, secondary battery control means for controlling the secondary battery, a libel cell which causes a predetermined fuel and air to electrochemically react with each other so as to cause a power generating unit to generate power, and fuel cell control means for controlling the fuel cell,
   wherein the secondary battery control means and the fuel cell control means mutually transfer at least remaining secondary battery power information indicative of an amount of power remaining in the secondary battery and a fuel cell status information indicative of a status of the fuel cell, to each other via the bus.

2. The electronic equipment according to claim 1, wherein the fuel cell control means acquires load information indicative of a load of the processing means via the bus and controls the fuel cell based on the load information.

3. The electronic equipment according to claim 2, wherein the fuel cell control means sets a plurality of operating modes for the fuel cell and determines an operating mode for the fuel cell based on the load information.

4. The electronic equipment according to claim 3, wherein the fuel cell control means determines the operating mode for the fuel cell by further taking the remaining secondary battery power information and the fuel cell status information into account.

5. The electronic equipment according to claim 1, wherein the fuel cell control means performs control so as to charge the secondary battery with the power outputted from the fuel cell.

6. The electronic equipment according to claim 1, wherein the fuel cell control means monitors a remaining amount of the fuel to be supplied to the fuel cell and controls the fuel cell based on the remaining amount.

7. The electronic equipment according to claim 1, further comprising control means connected to the bus, for monitoring a remaining amount of the fuel stored in a tank for supplying the fuel to the fuel cell, wherein the fuel cell control means controls the fuel cell based on the remaining amount of the fuel detected by the control means.

8. The electronic equipment according to claim 1, wherein the secondary battery and the secondary battery control means as well as the fuel cell and the fuel cell control means are constructed as a single package and are externally connected to the body via the bus.

9. The electronic equipment according to claim 1, wherein the secondary battery and the secondary battery control means are contained in the body, while the fuel cell and the fuel cell control means are constructed as a single package and are externally connected to the body via the bus.

10. The electronic equipment according to claim 1, wherein the fuel cell and the fuel cell control means are contained in the body, while the secondary battery and the secondary battery control means are constructed as a single package and are externally connected to the body via the bus.

11. The electronic equipment according to claim 1, wherein the secondary battery and the secondary battery control means are constructed as a single package and are externally connected to the body via the bus, while the fuel cell and the fuel cell control means are constructed as a single package separate from the package and are externally connected to the body via the bus.

12. The electronic equipment according to claim 1, wherein the secondary battery and the secondary battery control means as well as the fuel cell and the fuel cell control means are contained in the body.

13. The electronic equipment according to claim 1, wherein the bus performs two-wire half-duplex communication.

14. A power management method for electronic equipment that includes a body at least having processing means for executing various processes and consuming power; and a power source connected to the body via a predetermined bus, including a secondary battery, secondary battery control means for controlling the secondary battery, a fuel cell which causes a predetermined fuel and air to electrochemically react with each other so as to cause a power generating unit to generate power, and fuel cell control means for controlling the fuel cell; wherein the electronic equipment operates on the basis of the power source,
   the power management method for the electronic equipment, comprising:
   mutually transferring at least remaining secondary battery power information indicative of an amount of power remaining in the secondary battery and fuel cell status information indicative of a status of the fuel cell between the secondary battery control means and the fuel cell control means via the bus; and
   controlling the fuel cell based on the remaining secondary battery power information and the fuel cell status information.

15. The power management method for the electronic equipment according to claim 14, further comprising:
   acquiring load information indicative of a load of the processing means by means of the fuel cell control means via the bus, wherein
   the fuel cell is controlled based on the load information associated with controlling the fuel cell.

16. A power source equipment connected via a predetermined bus to a predetermined electronic equipment body at least having processing means for executing various processes and consuming power, for supplying power to the electronic equipment body, the electronic equipment comprising:
   a secondary battery;
   secondary battery control means for controlling the secondary battery;
   a fuel cell which causes a predetermined fuel and air to electrochemically react with each other so as to cause a power generating unit to generate power; and fuel cell control means for controlling the fuel cell,
wherein the secondary battery control means and the fuel cell control means mutually transfer at least remaining secondary battery power information indicative of an amount of power remaining in the secondary battery and fuel cell status information indicative of a status of the fuel cell, to each other via the bus.

17. The power source unit according to claim 16, wherein the secondary battery control means and the fuel cell control means are connected to the electronic equipment body via the bus; and
the fuel cell control means acquires load information indicative of a load of the processing means via the bus and controls the fuel cell based on the load information.

18. The power source unit according to claim 17, wherein the fuel cell control means sets a plurality of operating modes for the fuel cell and determines an operating mode for the fuel cell based on the load information.

19. The power source unit according to claim 18, wherein the fuel cell control means determines the operating mode for the fuel cell by further taking the remaining secondary battery power information and the fuel cell status information into account.

20. The power source unit according to claim 16, wherein the fuel cell control means performs control so as to charge the secondary battery with the power outputted from the fuel cell.

21. The power source unit according to claim 16, wherein the fuel cell control means monitors a remaining amount of the fuel to be supplied to the fuel cell and controls the fuel cell based on the remaining amount.

22. The power source unit according to claim 16, further comprising control means connected to the bus, for monitoring a remaining amount of the fuel stored in a tank for supplying the fuel to the fuel cell, wherein
the fuel cell control means controls the fuel cell on the basis of the remaining amount of the fuel detected by the control means.

23. The power source unit according to claim 16, wherein the bus performs two-wire half-duplex communication.

24. The electronic equipment according to claim 1, wherein the power source is a hybrid battery pack in which the secondary battery and the fuel cell are compositely combined with each other.

25. The power management method according to claim 14, wherein the power source is a hybrid battery pack in which the secondary battery and the fuel cell are compositely combined with each other.

26. The power source unit according to claim 16, wherein the power source is a hybrid battery pack in which the secondary battery and the fuel cell are compositely combined with each other.

* * * * *